Sept. 20, 1971 W. S. McCORMICK ET AL 3,605,188
PLASTIC MIXER AND EXTRUDER
Filed Aug. 8, 1969

INVENTORS
WILLIAM S. McCORMICK
WILLIAM R. TOPPER

BY Oberlin, Maky, Donnelly & Renner
ATTORNEYS

3,605,188
PLASTIC MIXER AND EXTRUDER
William S. McCormick, Cuyahoga Falls, Ohio, and William R. Topper, Newark, Del., assignors to NRM Corporation, Akron, Ohio
Filed Aug. 8, 1969, Ser. No. 848,633
Int. Cl. B29f 3/00, 3/06
U.S. Cl. 18—12SP    6 Claims

ABSTRACT OF THE DISCLOSURE

A twin conical screw plastic mixer and extruder having intermeshing conical screws rotatable within tapered, intersecting cylinder bores, and mechanism for axially adjusting the screws with respect to the tapered cylinder bores thus to vary the degree of mixing of the material according to the leakage flow of material over the screw flights. When the screw axes converge toward the die inlet, the adjusting mechanism also changes the degree of intermeshing of the screw flights to further influence the mixing action.

BACKGROUND OF THE INVENTION

In known screw extruders, the head pressure (or output) of the extruder is varied by varying the screw speed, the output being nearly proportional to screw speed; and the back pressure on the material is controlled by valve means to optimize the mixing and plasticizing of the material. The range of adjustment, however, is quite limited whereby if the extrusion of a product requires a specified head pressure (or output) which departs substantially from that for which the extruder was designed, the use of a larger or smaller extruder may be necessary if optimum mixing is to be maintained. In normal extrusion and/or mixing operations, it is usually required to maintain a constant output, and hence, the conventional methods of controlling the degree of mixing of the material, i.e. regulation of head pressure and screw speed, do not achieve the desired end of constant output.

SUMMARY OF THE INVENTION

Contrary to the foregoing, the present plastic mixer and extruder employs twin intermeshed conical screws which are adjustable in the cylinder to control the mixing of the material to specified magnitude while at the same time extruding a predetermined rate irrespective of the head pressure required. Accordingly, with the present invention both the position of the screws in the cylinder and the screw speeds may be adjusted to provide a wide range of degrees of mixing or a wide temperature range for any required output rate.

The foregoing constitute the principal objects of this invention and other objects and advantages will become apparent as the following description proceeds.

DISCUSSION OF THE INVENTION

Figure 1:
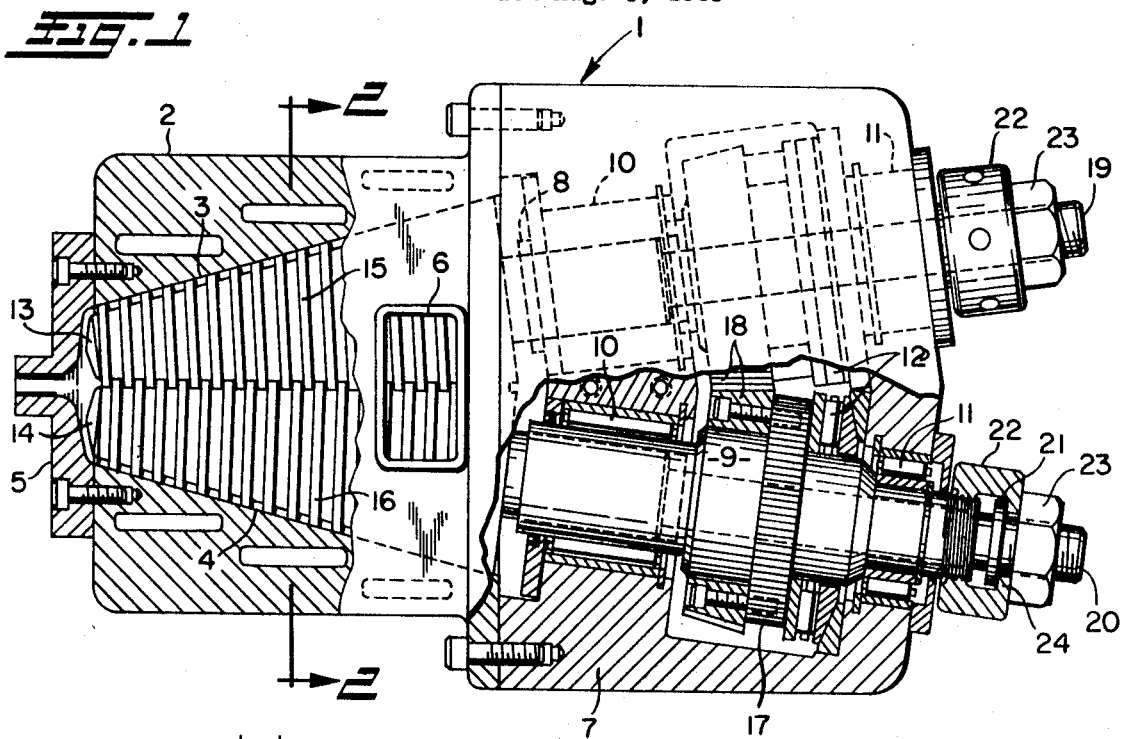
FIG. 1 is a top plan view, partly in cross section, of one embodiment of the present invention.
Figure 2:
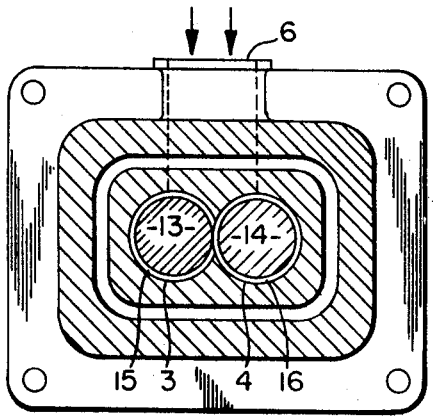
FIG. 2 is a transverse cross-section view taken substantially along the line 2—2, FIG. 1.
Figure 3:
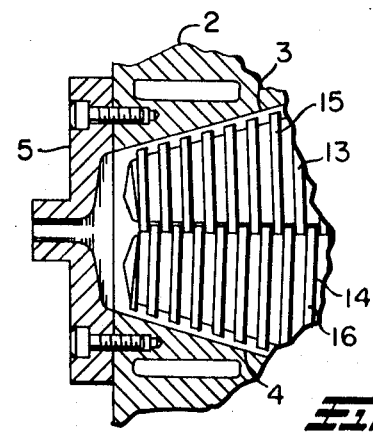
FIG. 3 is a fragmentary cross-section view of the FIG. 1 extruder showing it in a position of adjustment to achieve a reduced head pressure at the die inlet.

In the embodiment of the invention illustrated in FIGS. 1 to 3, the plastic mixer and extruder 1 comprises a cylinder 2 having converging and intersecting conical bores 3 and 4. Adjacent the small ends of said bores 3 and 4 the cylinder 2 has secured thereto a suitable die 5 through which it is desired to extrude the plasticized material which is adapted to be introduced into the cylinder 2 in discrete solid form through the feed opening 6.

The cylinder 2 is secured to a housing assembly 7 in which drive sleeves 8 and 9 are supported by radial bearings 10 and 11 and axial thrust bearings 12 for rotation about converging axes coinciding with the axes of the conical bores 3 and 4 in the cylinder.

Splined or otherwise axially slidably keyed in the respective drive sleeves 8 and 9 are the intermeshing conical screws 13 and 14 which are rotatable in the bores 3 and 4 to feed plastic material from the feed opening 6 toward the die 5 and to plasticize and mix the material during the course of its travel through the helical channels defined beween the flights 15 and 16 of the respective screws 13 and 14. The drive sleeve 9 has thereon a drive gear 17 which is adapted to mesh with a motor driven pinion (not shown) and the driving of said drive sleeve 9 drives the other drive sleeve 8 through the intermeshing bevel gears 18.

The shaft extensions 19 and 20 of the screws 13 and 14 extend through the drive sleeves 8 and 9 and are provided with thrust collars 21 engaged with nuts 22 having threaded engagement with the respecive drive sleeves 8 and 9. Lock nuts 23 are threaded on the ends of said shaft extensions 19 and 20.

When it is desired to increase the leakage flow, the lock nuts 23 are loosened and the nuts 22 are turned to move the flanges 24 thereof away from the thrust collars 21 and upon retightening of the lock nuts 23, the screws 13 and 14 will be pulled rearwardly until the thrust collars 21 are engaged with the respective flanges 24. In adjusted position as shown in FIG. 3, there will be leakage flow of the plastic material over the flights 15 and 16, that is, through the clearance between the respective screws 13 and 14 and the conical bores 3 and 4 in the cylinder 2. Also, because the adjustment herein is along the axes of the respective screws 13 and 14, the intermeshing portions of the flights 15 and 16 are moved radially apart whereby plastic material may leak therebetween. Now, if it be desired to decrease the leakage flow, the adjusting nuts 22 are turned in the opposite direction to move the screws 13 and 14 toward the die 5 to thus decrease the clearance between the screw flights 15 and 16 and the cylinder bores 3 and 4 while yet desired mixing action is achieved with decreased leakage flow and the thorough mixing achieved where the screw flights 15 and 16 are in intermeshing relation.

Figure 4:
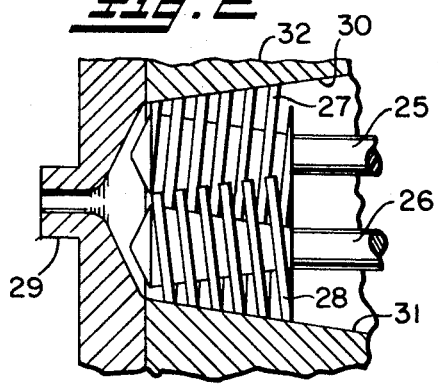
FIG. 4 is a fragmentary cross-section view of another embodiment of the present invention.

In FIG. 4 the twin conical screws 25 and 26 are provided with helical flights 27 and 28 of decreasing radial dimension toward the die 29 and the shafts thereof are parallel. It can be seen that axial adjustment of said screws 25 and 26 will vary the clearance between the screw flights 27 and 28 and the respective conical bores 30 and 31 of the cylinder 32 thus to control head pressure while achieving desired, thorough mixing action.

Although the invention has herein been illustrated in connected with an extruder where the plasticized material is fed under pressure through a die 5 or 29, it is to be understood that the principles of the invention may be applied to blow molding, injection molding, etc. In injection molding, for example, the mixing and preplasticization of the material may be accomplished with the screws in retracted position or with the cylinder moved forward with respect to the screws, and when a shot is required, the screws would be moved forward with respect to the cylinder or the cylinder moved backward whereby the head pressure would be increased to that necessary for injecting the plasticized material into a mold.

The screw adjusting mechanism herein shown is to be regarded as merely exemplary and it is apparent that other well known mechanisms may be employed, and, in fact, both screws may be simultaneously adjusted. Moreover, such adjustment may be accomplished automatically in response to head pressure by providing a pressure sensor (not shown) at the die inlet which then provides a signal to move the screws forward or rearward as necessary to increase or decrease the head pressure sensed by the sensor.

It can be seen that with the present extruders it is possible to maintain a constant output, and therefore constant head pressure while varying the screw speed and leakage flow to obtain proper mixing for the proper extrudate temperature.

We, therefore, particularly point out and distinctly claim as our invention:

1. A plastic mixer and extruder comprising a cylinder having a pair of intersecting tapered bores terminating at their small ends in an outlet for plastic material; a pair of tapered screws rotatable in the respective bores in said cylinder, said screws having intermeshing helical flights which define channels for compressing, working, and mixing of plastic material as it is advanced from the large ends of said bores toward said outlet; and adjusting means for relatively moving said screws and cylinder to provide variable leakage gaps between said flights and the respective bores to control pressure and flow of material through said outlet.

2. The mixer and extruder of claim 1 wherein the axes of said screws and bores converge toward said outlet; and wherein said adjusting means is operative to move said screws along their respective axes thus to provide additional variable leakage gaps at the intermeshing portions of said flights.

3. The mixer and extruder of claim 1 wherein the axes of said screws are parallel and coincide with the axes of the respective bores; and wherein said flights are of decreasing radial height toward said outlet.

4. A plastic mixer and extruder comprising a cylinder having a pair of intersecting tapered bores terminating at their small ends in an outlet for plastic material; a pair of tapered screws rotatable in the respective bores in said cylinder, said screws having intermeshing helical flights which define channels for compressing, working, and mixing of plastic material as it is advanced from the large ends of said bores toward said outlet; a housing to which said cylinder is secured; drive sleeves journalled in said housing having intermeshing gears and having shaft portions of the respective screws axially slidably keyed therein; a drive gear on one of said sleeves by which said drive sleeves and screws are driven; and adjusting means on said drive sleeves and shaft portions operative to move said screws relative to said cylinder thus to provide variable leakage gaps between said flights and the respective bores to control pressure and flow of material through said outlet.

5. The mixer and extruder of claim 4 wherein the axes of said screws and bores converge toward said outlet; and wherein said adjusting means moves said screws along their respective axes thus to provide additional variable leakage gaps at the intermeshing portions of said flights.

6. The mixer and extruder of claim 4 wherein the axes of said screws are parallel and coincide with the axes of the respective bores; and wherein said flights are of decreasing radial height toward said outlet.

References Cited

UNITED STATES PATENTS

| 155,602 | 10/1874 | Wiegand | 18—12(SP) |
| 2,543,894 | 3/1951 | Colombo | 18—12(SP) |
| 2,566,854 | 9/1951 | Rhodes | 18—12(SA)X |
| 2,916,769 | 12/1959 | Baigent | 18—12(SP)X |
| 2,970,341 | 2/1961 | Mallory et al. | 18—12(SA) |
| 2,996,756 | 8/1961 | Korsch et al. | 18—12(SA)X |
| 3,090,992 | 5/1963 | Schlachter et al. | 18—12(SA) |

FOREIGN PATENTS

| 879,861 | 6/1953 | Germany | 18—12SP |

ROBERT L. SPICER, Jr., Primary Examiner

U.S. Cl. X.R.

18—12SM, 30SS; 241—252; 418—21